United States Patent
Choi

[11] Patent Number: 6,165,242
[45] Date of Patent: Dec. 26, 2000

[54] PLEATED FILTER MEDIA WITH CREST SPACERS AND METHOD OF MAKING

[75] Inventor: Kyung-Ju Choi, Louisville, Ky.

[73] Assignee: AAF International, INC, Louisville, Ky.

[21] Appl. No.: 09/277,795

[22] Filed: Mar. 27, 1999

[51] Int. Cl.[7] ............................................. B01D 46/52
[52] U.S. Cl. .................. 55/524; 55/497; 55/521; 210/493.3; 210/506; 210/507
[58] Field of Search ............... 55/497, 498, 499, 55/500, 511, 514, 54, 55, 524; 210/493.1, 493.3, 493.5, 506, 507

[56] References Cited

U.S. PATENT DOCUMENTS

| | | |
|---|---|---|
| 4,177,050 | 12/1979 | Culbert et al. . |
| 4,268,290 | 5/1981 | Barrington . |
| 4,537,812 | 8/1985 | Elbers . |
| 4,707,167 | 11/1987 | Saito et al. ................................. 55/521 |
| 5,028,331 | 7/1991 | Lippold . |
| 5,064,598 | 11/1991 | Seiler . |
| 5,066,400 | 11/1991 | Rocklitz et al. . |
| 5,080,790 | 1/1992 | Widmann ................................. 55/521 |
| 5,290,447 | 3/1994 | Lippold ................................... 55/521 |
| 5,552,048 | 9/1996 | Miller et al. ............................. 55/521 |
| 5,744,036 | 4/1998 | Choi . |
| 5,871,836 | 2/1999 | Sanltink et al. ......................... 55/521 |
| 5,888,262 | 3/1999 | Kahler .................................... 55/521 |
| 6,036,752 | 3/2000 | Reuter .................................... 55/521 |

*Primary Examiner*—David A. Simmons
*Assistant Examiner*—Minh-Chau T. Pham
*Attorney, Agent, or Firm*—Polster, Lieder, Woodruff & Lucchesi, L.C.

[57] ABSTRACT

A pleated filter and method of making the same wherein the crests of pleated filter medium include nesting daubs of pleat spreading and pleat maintaining material located at the crests to define free flow valleys between opposed pleat faces for efficient passage of a fluid stream to be treated therethrough from upstream through downstream pleat faces.

25 Claims, 3 Drawing Sheets

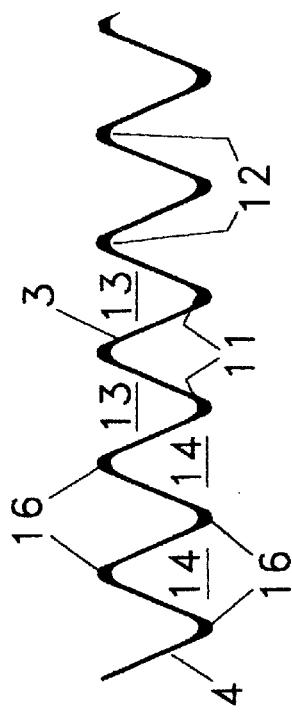
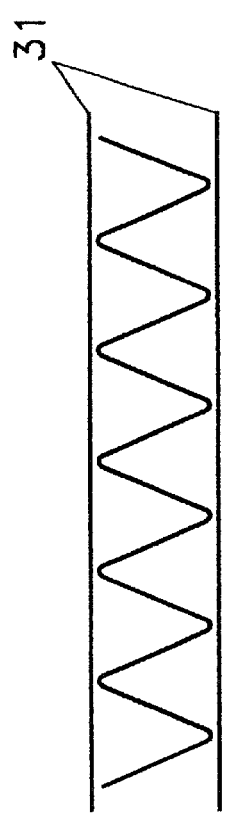
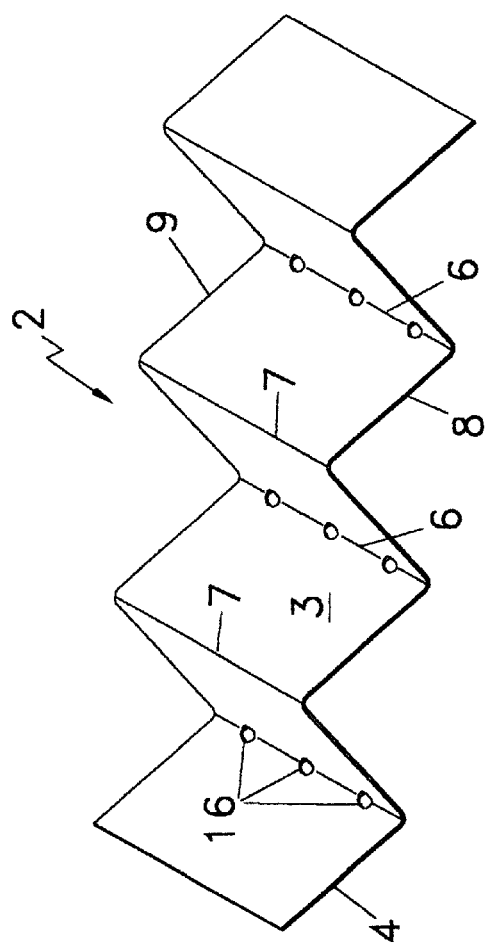
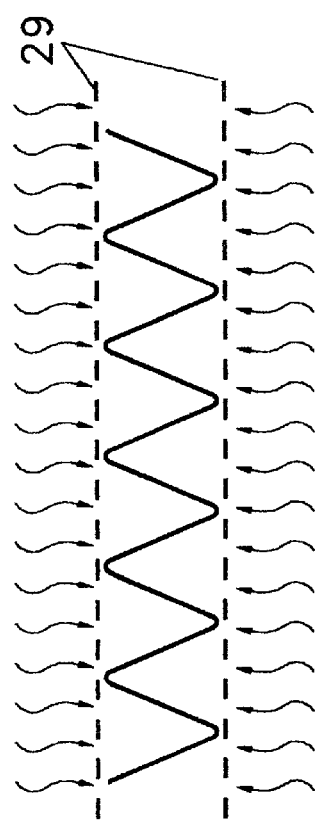

PLEATED FILTER MEDIA WITH CREST SPACERS AND METHOD OF MAKING

BACKGROUND OF THE INVENTION

The present invention relates to a filter medium arrangement and method of making the same and more particularly to a unique and novel pleated filter medium and method of making the same which utilizes minor daubs of adhesive spacer materials specifically located along pleat crests to spread and maintain opposed faces of the pleats in spaced, free-flowing, uninterrupted pleat valleys.

Various filter medium spacing arrangements are known in the filter art, such as the spacer rib arrangement disclosed as prior art in applicant's co-filed and co-pending related application Ser. No. 09/277,795, filed on Mar. 27, 1999. In this related application by applicant, several pleat spacer patents were noted and described but none, either alone or in combination, teaches or suggests the novel arrangement of the referred to related application; nor, do any teach or suggest—either alone or in combination—the unique and novel apparatus and method described herein. The aforementioned patent reference noted and briefly described in the related copending patent application include: U.S. Pat. No. 4,268,290, issued to R. B. Barrington on May 19, 1981; U.S. Pat. No. 5,028,331, issued to H. J. Lippold on Jul. 2, 1991; U.S. No. 5,064,598, issued to H. Seiler on Nov. 12, 1991; U.S. Pat. No. 5,066,400, issued to G. J. Rocklitz on Nov. 19, 1991; U.S. Pat. No. 4,177,050, issued to R. M. Culbert et. al. on Dec. 4, 1979; U.S. Pat. No. 4,537,812, issued to R. W. Elbers on Aug. 27, 1985; and, U.S. Pat. No. 5,744,036, issued to K. J. Choi on Apr. 28, 1998. As noted in the copending application, for the most part, the structures disclosed in these patents have been comparatively complex and expensive in manufacture and assembly, requiring numerous parts and assembly steps and presenting comparatively high fluid resistance to the treated fluid stream. Such is the case in the present application.

The present invention, like the related copending application and even more so, provides a pleated filter medium arrangement which also is economical and straight forward in manufacture and assembly, requiring even more so, an improved minimum of parts and method steps and, at the same time, also providing a pleated filter medium which is comparatively stable and readily producible in various shapes and configurations, even further optimizing the amount of filter medium face to a fluid stream to be treated and further reducing the quantities of material required to accomplish the same, the present invention providing an even lower amount of resistance which is presented to the fluid stream to be treated.

Various other features of the present invention as described herein will become obvious to one skilled in the art upon reading the disclosure herein.

BRIEF SUMMARY OF THE INVENTION

More particularly, the present invention provides a filter medium arrangement for removing particulate matter from a fluid stream comprising: at least one sheet of porous filter medium having opposed sheet faces, the filter medium sheet being pleated into a plurality of longitudinally extending spaced pleats of porous filter medium with adjacent pleats having opposed upstream and downstream sets of crests and valleys; and, pleat spreader and maintenance spacer means cooperative with at least one selected set of the pleat sets of crests, the spacer means being positioned at the immediate crests of the pleats in sufficient quantities to spread and maintain the pleats in a preselected, spread, spaced, open-faced position with opposed pleat faces being so spaced as to define free-flow valleys therebetween for uninterrupted passage of a fluid stream to be treated as such stream is passed therethrough from the upstream through the downstream faces of the pleats. In addition, the present invention provides a method of making spaced, pleated filter media comprising: feeding a longitudinally extending, continuous flat sheet of porous filter media having opposed faces from a supply zone to an applicator zone; applying daubs of pleat spacing material to at least one face of the sheet of filter media at one preselect stage of the method in an applicator zone with the daubs being applied in preselected quantities and in longitudinally spaced relation to each other along the length of the filter media sheet; and, folding the filter media sheet at another preselected stage of the method in a pleating zone to pleat the sheet of filter media into pleats with the daubs having been applied in sufficient quantities to substantially nest in the pleat crests to maintain opposed faces of the pleats in spaced free-flow relation. Further, the present invention provides for the scoring of the filter media in a scoring zone along corresponding transverse lines where daubed and heating the filter media and daubing material at preselected locations in the method before cutting and framing the pleated filter media into pleated filter medium units.

BRIEF DESCRIPTION OF THE DRAWINGS

Referring to the drawings which disclose an advantageous embodiment of the present invention and a modification thereto:

FIG. 1 discloses a portion of a face of pleated porous filter media with the pleats displayed in exaggerated spread form to illustrated applied daubs of pleat spreader and maintenance spacer material spaced transversely across the filter media in spaced longitudinal alignment so as to be in nesting engagement at the pleat crests;

FIG. 2 is a side view of the pleated porous filter media portion of FIG. 1 with the daubs and pleats in preselected spread and maintenance spaced form;

FIG. 3 is a schematic view illustrating one embodiment for applying heat to the filter media in the novel pleating process;

FIG. 4 is a schematic view illustrating another embodiment for applying heat to the filter media in the novel pleating process; and, FIG. 5 is a schematic view of one arrangement of apparatus which can be employed in the several zones for the steps involved in a novel filter media method.

DETAILED DESCRIPTION OF THE INVENTION

Figure 5:
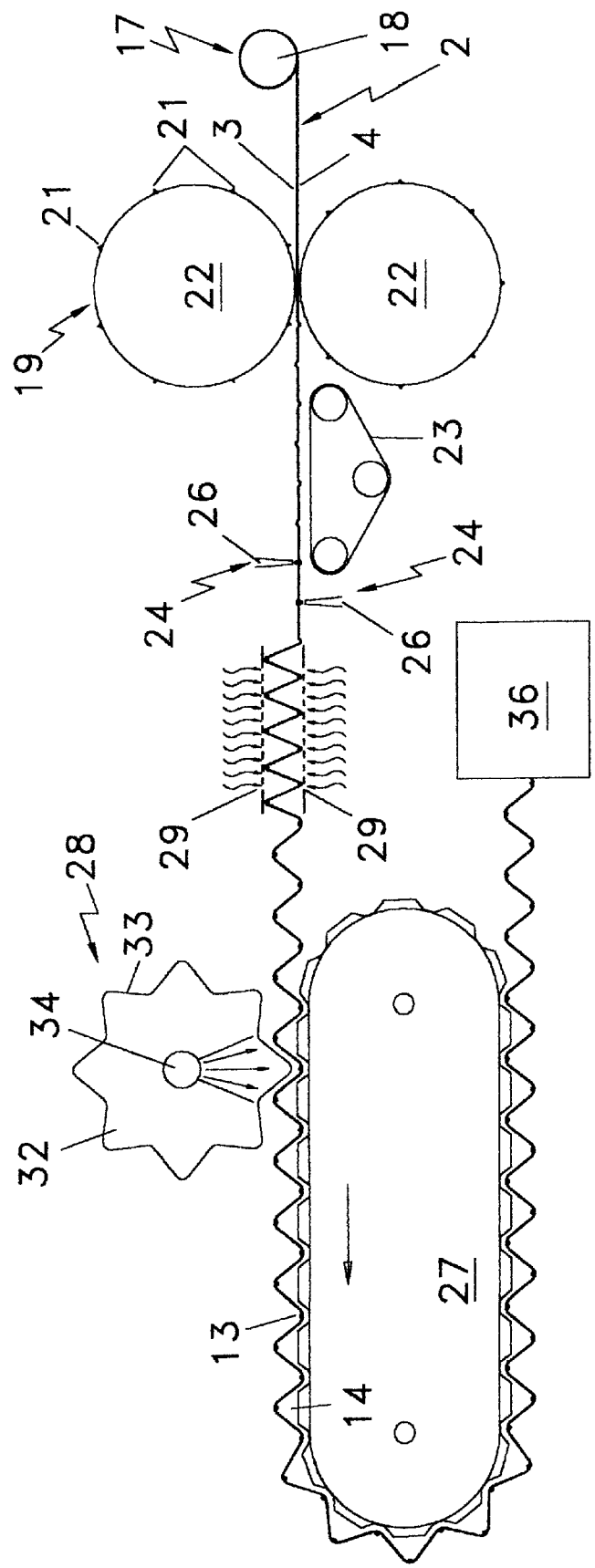

Referring to FIGS. 1 and 2 of the drawings, a portion of filter medium 2 is disclosed as spread in exaggerated form in FIG. 1 and in proper spread and crest maintenance form in FIG. 2. Filter medium sheet 2 includes opposed filter faces 3 and 4, one of which filter faces serves during fluid filtering operations as an upstream face and the other of which serves as a downstream face. The filter medium 2 can be formed from any one of a number of known fibrous filter materials, such as spun or chopped glass fibers, a suitable fibrous polymeric material, or a natural fiber material, or from a mixture of preselected percentages by weight of such fibers. The porosity and sizes of the fibers can be adjusted in accordance with commercial filtering needs, as can the depth, width and breadth of the inventive filter medium unit desired herein, which also can be preselected in accordance with filtering needs.

As can be seen in FIGS. 1 and 2, filter medium 2 is pleated into a plurality of a longitudinally extending spaced pleats along the longitudinally spaced fold lines 6 and 7 which extend in preselectively spaced arrangement between the opposed longitudinally extending edges 8 and 9 of the porous filter medium 2 to provide crests 1 1 and 12 on opposed faces of the filter medium and valleys 13 and 14 associated therewith, respectively (FIG. 2).

In accordance with one feature of the present invention, spaced fold lines 6 and 7 are scored a preselected depth and at a preselected transverse spacing to enhance the pleating of the filter medium along fold lines 6 and 7. The scores extend linearly along the upstream and downstream crests 11 and 12 on opposed faces 3 and 4 of filter medium 2. In further accordance with the present invention, daubs 16 of a suitable material are provided along each scored line 6 and 7 in the inventive embodiment disclosed. The daubs 16 are of a preselected chemistry and quantity in accordance with the geometry and material composition of the filter medium namely, size in width, depth and breadth and in accordance with the filter medium material employed. The daubs or beads 16 can be incrementally, transversely spaced and aligned along each score line or they can be in the form of a lineal strip, it being desirable that they be of sufficient but not excessive quantity so that the opposite pleat faces forming the pleat valleys 13 and 14 are spread and maintained in a desired preselected position with the valleys 13 and 14 being unrestricted for free flow of the fluid stream through the pleated medium. In accordance with one advantageous embodiment of the present invention, the daubs 16 can be formed from a fluid pliable adhesive plastic which is thermobondable and which can set in fast pleat spreading and pleat maintaining position. As in the corresponding patent application, a small percentage by weight of calcium carbonate or clay can be included in the plastic adhesive daub material to enhance flame retardancy and to reduce material costs.

Figure 6:
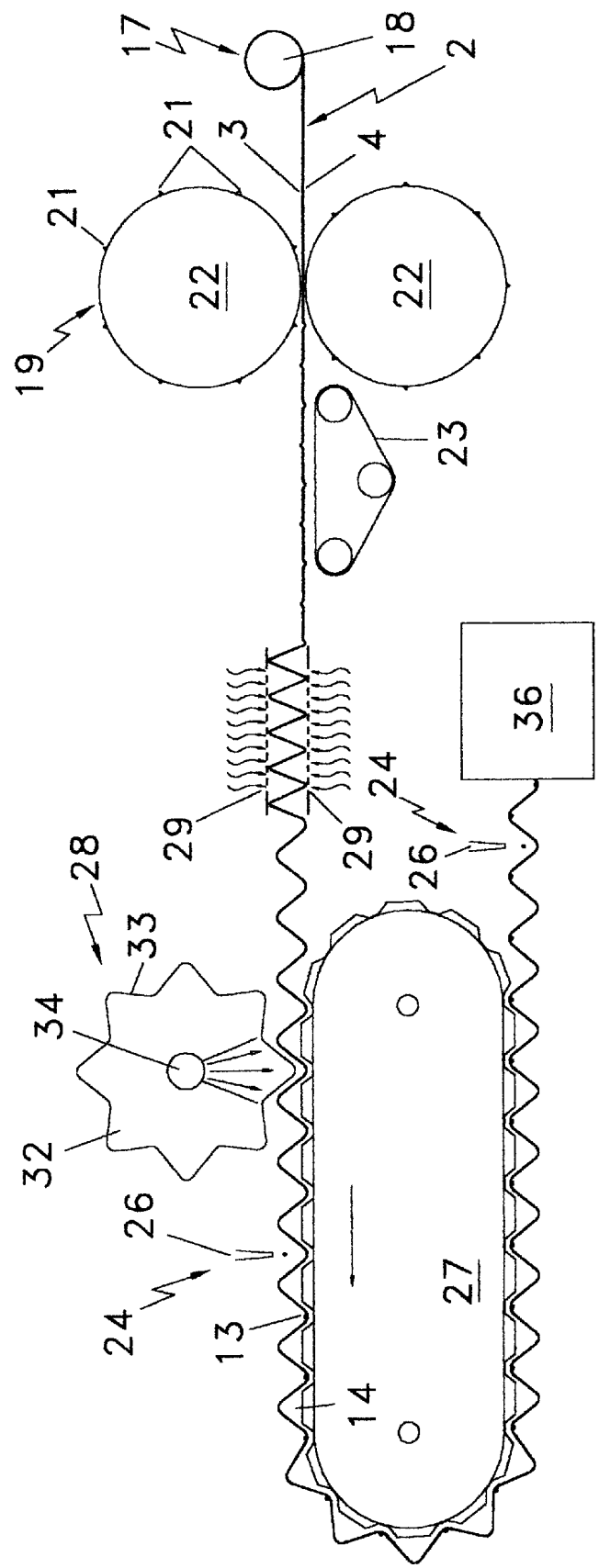
FIG. 6 is a schematic view of another arrangement of apparatus which can be employed in the several zones for the steps involved in another novel filter media method.

Referring to FIGS. 3 through 6, schematically disclosed apparatus for carrying out the novel method of the present invention can be seen. It is to be understood that other types of apparatus can be employed in addition to those schematically disclosed herein to accomplish the novel steps hereinafter described. One novel method of making the unique spaced pleated filter medium units 2, such as disclosed in FIG. 2 of the drawings is disclosed in the arrangement of FIG. 5. This novel method includes the steps of feeding a longitudinally extending continuous flat sheet of porous filter media from a supply zone 17, the porous filter media 2 which can be any one of several materials as above described, including natural fibers or fiberglass, or a suitable synthetic, or a preselected mixture of the same can be stored in supply zone 17 or in roll form 18 as shown. The filter media 2 is fed from roll 18 in supply zone 17 to a scoring zone 19 where suitable spaced blades 21 on opposed scoring rolls 22 serve to score the flat sheet of filter media 2 in longitudinally spaced, transversely extending lines as the media is passed therethrough with longitudinally spaced score lines extending transversely between the opposed, spaced longitudinally extending edges 8 and 9 of filter media 2 and with the longitudinally spaced score lines on one face of filter media 2 being offset from the score lines on the other or opposite face of filter media. It is to be understood that the geometry and configuration of the scores can be varied and, in one embodiment of the present invention, the scoring of the filter media—which can serve to enhance subsequent daubing and pleating—can even be eliminated if the type of selected filter media so permits. After the filter media scoring has been accomplished—if a scoring step is elected—the spaced, transversely scored filter media then is fed on an appropriate first endless belt conveyor 23 moving at a preselected speed to an applicator zone 24. At applicator zone 24, daubs 16 of hot, melted plastic adhesive 16 are applied by applicators 26 along the spaced score lines on both of the opposed faces 3 and 4 of filter media sheet 2. The daubed filter media sheet 2 is then passed to a slower speed endless belt conveyor 27 in pleating zone 28. Since conveyor 27 moves at a slower speed than endless belt conveyor 23, the filter media conveyed thereto is caused to fold into a plurality of pleats, providing the aforediscussed crests 11 and 12 with corresponding valleys 13 and 14 (FIG. 2). It is to be noted that filter media 2 can be heated while in the pleating zone by blasts of hot air emanating from screened hot air conduits 29 spaced above and below the path of the filter media (FIG. 3), or from suitable spaced heating plates 31 (FIG. 4) which also can be spaced above and below the filter media path. It further is to be noted that in place of the aforedescribed different speed endless belt conveyors 23 and 27 utilized to form the pleats, it would be possible to use offset reciprocating mechanical arms above and below the filter media path (as known in the art) to alternatively engage the opposed faces of the porous filter media and pleat the same along the daubed score lines. Further, in the pleating zone 28, if it is desired to further spread the pleats of filter media 2, the pleated media can be passed under rotating pleat spreader wheel 32 with star shaped periphery 33. Periphery 33 cooperates with the rotating spreader wheel to respectively engage the valleys and crests of the pleated filter media to further spread the same. A suitable perforated hot air conduit 34 cooperates with the peripherally starred spreader wheel 32 to insure daubs 16 nesting in the crests maintain a pliable state during further pleat spreading. From the pleating and spreader zone 28, the filter media is then passed to a filter media cutting zone to cut the pleated filter media sheet of approximately spread pleats into filter media units sized in length in accordance with filtering needs. Finally, the severed filter medium units can be passed to a cutting and framing zone 36 where any one of several types of stable frames can be assembled in supporting relation with each cut filter medium unit. In another inventive embodiment as disclosed in FIG. 6 of the drawings, the applicator zone 24, is positioned after the pleating zone 28 with daub 16 applicator 26 being downstream spreader wheel 32 and between conveyor 27 and cutting and framing zone 36.

The invention claimed is:

1. A pleated filter medium arrangement for removing particulate matter from a fluid stream comprising: at least one sheet of porous filter medium having opposed sheet faces, said filter medium sheet being pleated into a plurality of longitudinally extending spaced pleats of porous filter medium with adjacent pleats having opposed upstream and downstream opposed spaced pleat faces defining upstream and downstream sets of crests and valleys; and pleat spreader and maintenance spacer means cooperative with at least one set of said pleat sets of crests, said spacer means being positioned at the immediate crests of the pleats in sufficient quantity to spread and maintain said pleats in a spread, spaced open-faced position with said opposed pleat faces being spaced to define free, unrestricted flow valleys therebetween for uninterrupted passage of a fluid stream to be treated therethrough from said upstream to said downstream spaced, opposed faces of said pleats.

2. The pleated filter medium arrangement of claim 1, said pleat spread means comprising a daub of material at each crest of said sets of crests.

3. The pleated filter medium arrangement of claim 2, said daub of material being a small quantity of adhesive material.

4. The pleated filter medium of arrangement of claim 3, said adhesive material being a heat flowable and setting polymeric material.

5. The pleated filter medium arrangement of claim 1, said porous filter medium being synthetic fibrous material.

6. The pleated filter medium arrangement of claim 1, said porous filter medium being fiberglass material.

7. The pleated filter medium arrangement of claim 1, said porous filter medium being natural fibrous material.

8. The pleated filter medium of claim 1, said porous filter medium being a mixture by weight of synthetic and fiberglass materials.

9. The pleated filter medium of claim 1, said porous filter medium being a mixture by weight of natural and synthetic materials.

10. The pleated filter medium of claim 1, said porous filter medium being a mixture by weight of natural and fiberglass materials.

11. The pleated filter medium of claim 1, said pleat spread and maintenance means being along said upstream set of crests.

12. The pleated filter medium of claim 1, said pleat spreader and maintenance means being along said downstream set of crests.

13. The pleated filter medium of claim 1, said pleat spreader and maintenance means being along both said upstream and downstream sets of crests.

14. The pleated filter medium of claim 1, said filter medium sheet being scored a defined depth, spacing and geometry at the crests thereof.

15. The pleated filter medium of claim 14, said scores at the crests of said filter medium being along only one face of said filter medium sheet.

16. The pleated filter medium of claim 14, said scores being on said upstream face of said filter medium.

17. The pleated filter medium of claim 14, said scores being on said downstream face of said filter medium.

18. The pleated filter medium of claim 14, said scores being on both faces of said filter medium.

19. The pleated filter medium of claim 1, said pleat spreader and maintenance means comprising at least one score and daub of material at each crest of said sets of crests.

20. The pleated filter medium of claim 19, said pleat spreader and maintenance scores and daubs being along said upstream set of crests of said filter medium.

21. The pleated filter medium of claim 19, said pleat spreader and maintenance scores and daubs being along said downstream set of crests of said pleated filter medium.

22. The pleated filter medium of claim 19, said pleat spreader and maintenance scores and daubs being along both upstream and downstream sets of crests of said pleated filter medium.

23. The pleated filter medium of claim 19, said pleat spreader and maintenance scores and daubs of each crest being in spaced series form along each crest.

24. The pleated filter medium of claim 19, said pleat spreader and maintenance scores of each crest being in spaced series form along each crest and said daubs extending in lineal form transversely along each crest.

25. A pleated filter medium arrangement for removing particulate matter from a fluid stream comprising: a sheet of porous fibrous filter medium having opposed sheet faces, said fibrous filter medium sheet being pleated into a plurality of longitudinally extending spaced pleats of porous fibrous filter medium with adjacent pleats having opposed upstream and downstream opposed spaced pleat faces defining upstream and downstream crests and valleys; spaced pleat spreader and maintenance scores and corresponding daubs for both said upstream and downstream crests of said pleated porous filter medium, said scores being of defined geometry and depth to lineally extend transversely between the edges of each of said upstream and downstream crests, said daubs corresponding with each of said spaced lineal transverse scores on said upstream and downstream crests, said daubs being formed from a defined quantity of pliable heat responsive plastic material capable of setting after being applied to said scores to space and maintain said opposed filter medium faces defining said upstream and downstream crests and valleys of said pleated filter medium in unrestricted form for uninterrupted passage of a fluid stream to be treated therethrough from said upstream to said downstream spaced opposed faces of said pleats.

* * * * *